United States Patent [19]

Ichimiya et al.

[11] 4,270,116
[45] May 26, 1981

[54] HIGH SPEED DATA LOGICAL COMPARISON DEVICE

[75] Inventors: Yoshichika Ichimiya, Tokorozawa; Tsuneta Sudo, Kodaira; Hiromi Maruyama, Gyoda; Shigeru Sugamori, Gyoda; Susumu Sumida, Gyoda; Masao Shimizu, Gyoda; Toshiaki Wakita, Gyoda, all of Japan

[73] Assignees: Nippon Telegraph and Telephone Public Corporation; Takeda Riken Kogyo Kabushikikaisha, both of Tokyo, Japan

[21] Appl. No.: 69,347

[22] Filed: Aug. 24, 1979

[30] Foreign Application Priority Data

Aug. 28, 1978 [JP] Japan ................................. 53-105301

[51] Int. Cl.³ ............................................... G06F 7/04
[52] U.S. Cl. ................................................ 340/146.2
[58] Field of Search ..................................... 340/146.2

[56] References Cited

U.S. PATENT DOCUMENTS

| | | | |
|---|---|---|---|
| 3,660,823 | 5/1972 | Recks | 340/146.2 |
| 3,694,642 | 9/1972 | Grannis | 340/146.2 X |
| 3,784,980 | 1/1974 | Geesen | 340/146.2 |

Primary Examiner—David H. Malzahn
Attorney, Agent, or Firm—Staas & Halsey

[57] ABSTRACT

Reference logical data is spatially divided by a data dividing circuit for each time slot, and the divided data are converted into data, each having a continuous effective period. The divided and converted reference data and input logical data are compared by comparators to detect whether or not they are coincident with each other. A clock signal for determining the timing of comparison is also divided by a clock signal dividing circuit into n clock signals which are displaced one time slot apart in phase and occurring with a period of n time slots. By these divided clock signals those of the outputs from the comparators corresponding thereto are taken out from a comparison output circuit.

9 Claims, 19 Drawing Figures

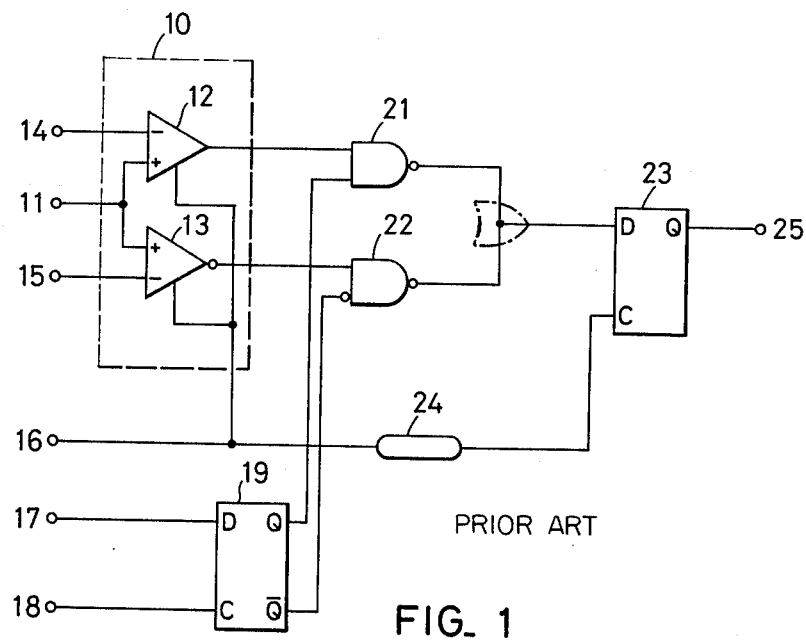
PRIOR ART
FIG. 1
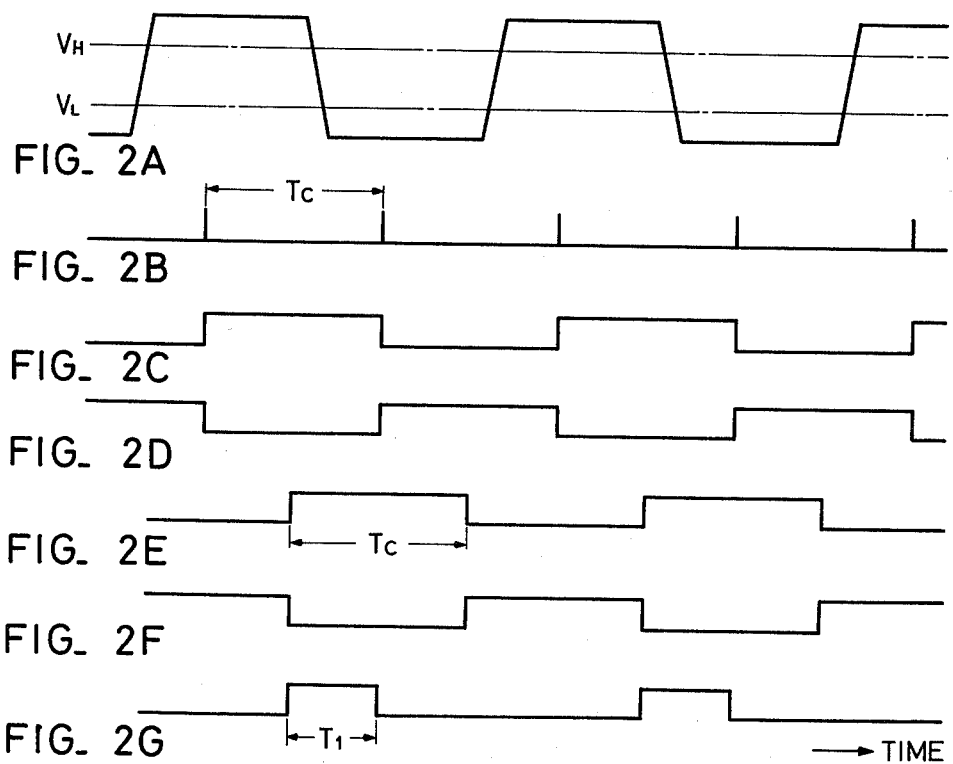
FIG. 2A
FIG. 2B
FIG. 2C
FIG. 2D
FIG. 2E
FIG. 2F
FIG. 2G
→ TIME

→ TIME

HIGH SPEED DATA LOGICAL COMPARISON DEVICE

BACKGROUND OF THE INVENTION

This invention relates to a logical comparison device for making a comparison between input logical data and reference logical data for each clock.

In a system for testing logical units, such as, for example, various types of semiconductor integrated circuits, it is necessary to apply a logical pattern to a unit under test and to decide by comparison whether the resulting output logical data derived therefrom is coincident with an expected value or not. In general, the comparison is made for each time slot of data and at each moment of the time slot. The comparison result is usually read in a logical circuit, such as a D flip-flop, and in order for the logical circuit to correctly read therein the input data, it is necessary that the input data lasts for a certain period of time, i.e. for the so-called set-up time $T_S$. In conventional types of logical comparison devices, input logical data and reference logical data are compared, with their effective lengths both selected equal to one time slot; consequently, near the end of one time slot of the input logical data, that is, in the period of the set-up time $T_S$ preceding the next time slot, the comparison result cannot be read in the logical circuit. Further, when the speed of the input logical data increases to reduce the length $T_C$, $T_C - T_S$ approaches zero, making it impossible to obtain correct comparison results.

SUMMARY OF THE INVENTION

An object of this invention is to provide a logical comparison device which permits decision of input logical data by comparison with reference logical data at any moment of the time slot of the former.

Another object of this invention is to provide a logical comparison device which permits a correct coincidence decision of even high-speed input logical data by comparison with reference logical data.

In accordance with the present invention, a reference logical data train is sequentially assorted by a data dividing circuit for each time slot into n (n being an integer larger than 1) data trains which are sequentially displaced one time slot apart in phase, and the data of each of the n data trains has an n time slot length. A clock signal for determining the timing of comparison is spatially divided by a clock signal dividing circuit into n clock signals which are sequentially phased one time slot apart and occur with a period of n time slots. The reference data divided by the data dividing circuit and input logical data are respectively compared by comparators, and the comparison results are each taken out of a comparison output circuit by a corresponding one of the divided clock signals derived from the clock signal dividing circuit. The input logical data is decided, in terms of timing, by a clock signal which bears a constant phase relationship to each of the above-mentioned clock signals having the one-time-slot period.

In a control signal dividing circuit, a control signal is spatially divided by the above-mentioned divided clock signals into n control signals which are sequentially phased one time slot apart and each of which has a width of n time slots. By these control signals, gates respectively connected between the comparators and the comparison output circuit are controlled. It is determined by the control signals whether the output from the logical comparison device is made effective or not.

The compared outputs from the comparators are also provided to a second output circuit, which is controlled by a second clock signal of the same period as the above-mentioned clock signal but of a fixed timing to output the inputted comparison results at the timing of the second clock signal. That is, the clock signal for determining the timing of comparison is changed in phase, but irrespective of the phase change, the comparison results are derived from the second output circuit at a fixed timing.

BRIEF DESCRIPTION OF THE DRAWING

FIG. 1 is a logical circuit diagram showing a conventional logical comparison device;

FIGS. 2A–2G are timing charts explanatory of the operation of the device shown in FIG. 1;

DESCRIPTION OF THE PREFERRED EMBODIMENTS

Figure 3:
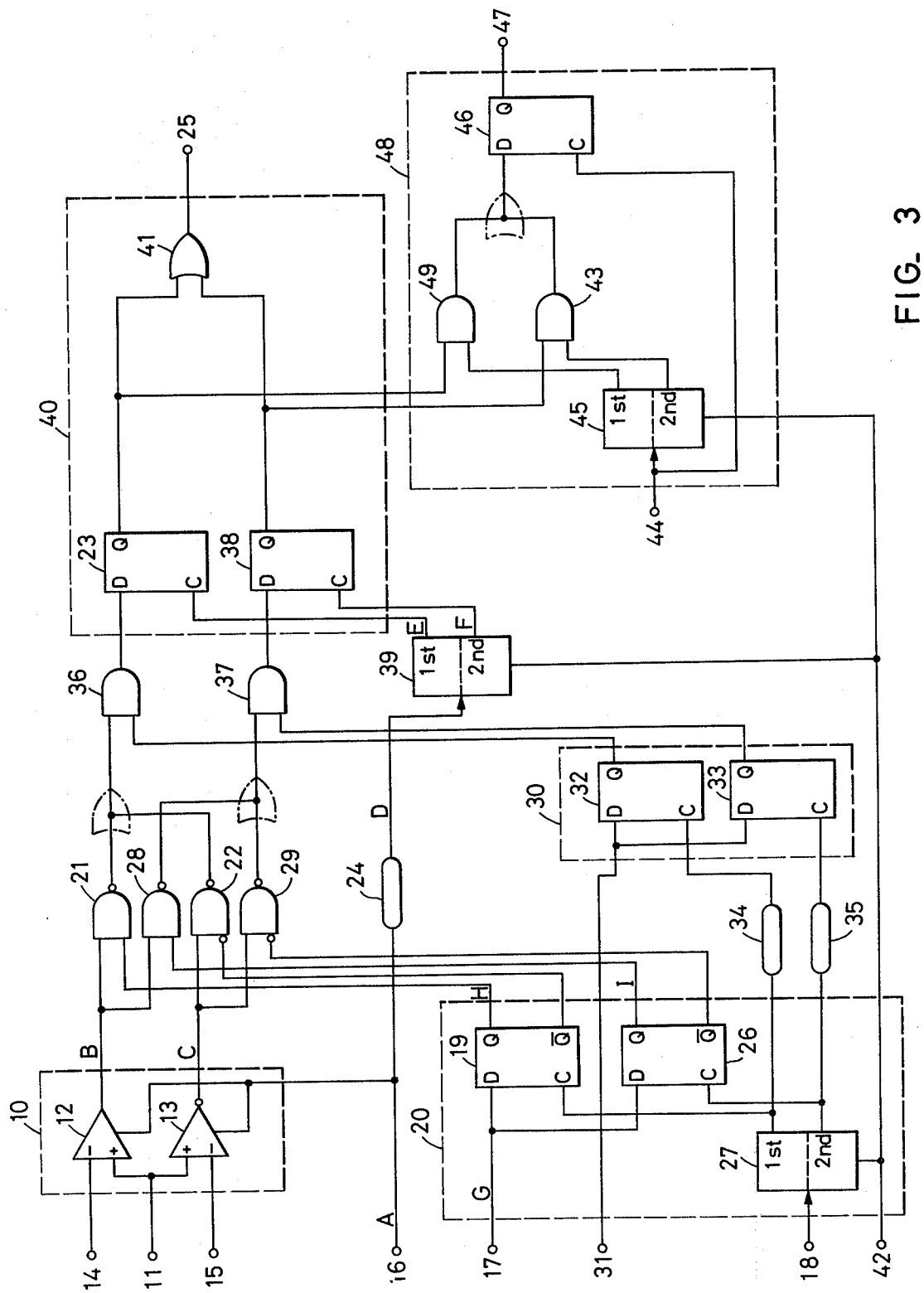
FIG. 3 is a logical circuit diagram illustrating an embodiment of a logical comparison device of this invention.

To facilitate a better understanding of this invention, a description will be given first of the conventional logical comparison device shown in FIG. 1. Input logical data such, for example, as shown in FIG. 2A, is applied via input terminal 11 to comparators 12 and 13 for comparison with reference voltages from terminals 14 and 15, for instance, high and low level voltages $V_H$ and $V_L$ respectively. The timing of comparison is determined by a clock signal (FIG. 2B) from a terminal 16. That is, if the input logical data is in excess of the high level $V_H$ when the clock signal is provided from the terminal 16, the comparator 12 decides the input logical data to be logic "1" and outputs it from that moment, as shown in FIG. 2C, whereas the comparator 13 decides the input logical data to be logic "1" and outputs a low-level voltage. In the case where the input logical data is lower than the low level $V_L$ when the clock signal is provided from the terminal 16, the comparator 12 decides the input logical data to be logic "0" and outputs it from that moment, and the comparator 13 also decides the input logical data to be logic "0" and outputs a high-level voltage. In other words, the comparators 12 and 13 make up a level and timing decision circuit 10 for the input logical data. The reason for employing two such comparators 12 and 13 is to detect, for example, such a state that the input logical data is lower than the high level $V_H$ but higher than the low level $V_L$.

Reference logical data, that is, expected value data is provided to a terminal 17 and read in a flip-flop 19 by a clock signal for determining the timing of comparison, from a terminal 18. Outputs Q and $\overline{Q}$ from the flip-flop 19 are provided therefrom as reference logical data of opposite polarities, for example, such as depicted in FIGS. 2E and 2F, and supplied to NAND gates 21 and 22 for comparison use, respectively, wherein they are compared with the results of decision by the comparators 12 and 13 respectively. The gate 21 detects coincidence between the input logical data of logic "1" from the comparator 12 and the output Q from the flip-flop 19, and the gate 22 detects coincidence between the input logical data of logic "0" from the comparator 13 with the output $\overline{Q}$ from the flip-flop 19. In the case of coincidence, each gate produces a low-level output and, in the case of non-coincidence, it produces a high-level output. That is, the gates 21 and 22 constitute a comparator for comparing the input logical data decided by the level and timing deciding circuit 10 with the reference logical data to detect whether they match with each other.

The outputs from the gates 21 and 22 are wired-OR'ed with each other and, the resulting signal or the comparison result is read in a flip-flop 23 serving as a comparison output circuit by the output from a delay circuit 24 which delays the clock signal from the terminal 16. The comparison result is provided to an output terminal 25.

In this logical comparison device, it is required to arbitrarily set the phase of the clock signal at the terminal 16 and to take out the comparison result at an arbitrary moment in each time slot $T_C$. However, since the effective period of each of the outputs Q and $\overline{Q}$ from the flip-flop 19 is one time slot $T_C$, and since the actuation of the flip-flop 23 calls for a minimum effective period of the data applied thereto, that is, the so-called set-up time $T_S$, the range in which to set the clock signal of the terminal 16 is limited specifically to $T_C-T_S$. For instance, in the example of FIG. 2, the output from the gate 21 becomes such as shown in FIG. 2G, but when the phase of the clock signal of the terminal 16 is advanced, the pulse width $T_1$ of the output from the gate 21 is reduced because the reference logical data has its phase fixed; if the output pulse width $T_1$ becomes smaller than the set-up time $T_S$, no correct comparison results can be obtained. Thus, the prior art device cannot achieve the comparison in some period of the time slot. Furthermore, when the speed of the input logical data increases to reduce one time slot $T_C$, $T_C-T_S$ approaches zero, making it impossible to obtain correct comparison results.

FIG. 3 illustrates an embodiment of the logical comparison device of this invention. This is the case of n=2, and parts corresponding to those in FIG. 1 are identified by the same reference numerals. In the illustrated embodiment, the reference logical data from the terminal 17 is also supplied to a data terminal D of a D flip-flop 26. The timing clock signal from the terminal 18 is applied as a shift pulse to a shift register 27, wherein it is divided by two to derive at its first and second stage outputs clock signals spatially divided into a 2m time slot (m=0, 1, 2, ...) and a 2m+1 time slot respectively. These spatially divided clock signals are respectively provided to clock terminals C of the flip-flops 19 and 26 to write therein the reference logical data. As a consequence, the reference logical data divided into two, each having an effective period of two time slots, are derived from the flip-flops 19 and 26 alternately with each other for each time slot. The flip-flops 19 and 26 and the shift register 27 make up a data dividing circuit 20.

In the 2m time slot, the outputs from the comparators 12 and 13 are respectively compared by the NAND gates 21 and 22 with the outputs Q and $\overline{Q}$ from the flip-flop 19, that is, one of the divided reference logical data. In the 2m+1 time slot, the above-mentioned outputs are respectively compared by NAND gates 28 and 29 with the outputs Q and $\overline{Q}$ from the flip-flop 26, that is, the other of the divided reference logical data. Control signals are applied from a terminal 31 to data terminals D of D flip-flops 32 and 33 and written therein by clock signals derived from delay circuits 34 and 35 respectively supplied with the first and second stage outputs of the shift register 27. In other words, the control signals are also converted into signals which are displaced one time slot apart in phase and are each effective for two time slots, and these signals are respectively provided to AND gates 36 and 37 for comparison control use. The flip-flops 32 and 33 form a control signal dividing circuit 30.

The AND gate 36 is supplied with the logical sum of the outputs from the gates 21 and 22, whereas the AND gate 37 is supplied with the logical sum of the gates 28 and 29. The gates 36 and 37 are connected to data terminals D of the flip-flops 23 and 38 respectively. The clock signal from the terminal 16, which is delayed by the delay circuit 24, is divided by a shift register 39 into clock signals which are phased one time slot apart and occur with a period of two time slots. By the thus divided clock signals, that is, first and second stage outputs of the shift register 39, data is written in the flip-flops 23 and 38; and the comparison results obtained at the outputs of the AND gates 36 and 37 are held for one time slot. The outputs from the flip-flops 23 and 38 are provided via an OR gate 41 to the output terminal 25. The flip-flops 23 and 38 and the OR gate 41 make up a comparison output circuit 40. The shift registers 27 and 39 are initially set by a signal from a terminal 42.

The outputs from the flip-flops 23 and 38 are also branched to be supplied to AND gates 49 and 43 respectively. A clock signal of a fixed timing and of the same period as the input logical data is applied from a terminal 44 to a shift register 45, wherein it is divided into clock signals which occur with a period of two time slots and are displaced one time slot apart in phase. These divided clock signals, that is, first and second stage outputs of the shift register 45 are respectively applied to the AND gates 49 and 43. The outputs from the AND gates 49 and 43 are wired-OR'ed with each other and then supplied to a data terminal D of a flip-flop 46 and read therein by the clock signal from the terminal 44. The output from the flip-flop 46 is derived at an output terminal 47. The gates 49 and 43, the shift register 45 and the flip-flop 46 constitute a second output circuit 48. The shift register 45 is also initialized by the signal from the terminal 42.

Figure 4A:
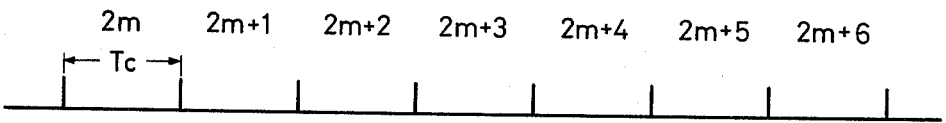
FIGS. 4A–4J are timing charts explanatory of the embodiment of this invention shown in FIG. 3.
Figure 4B:
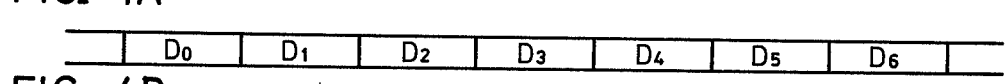
Figure 4C:
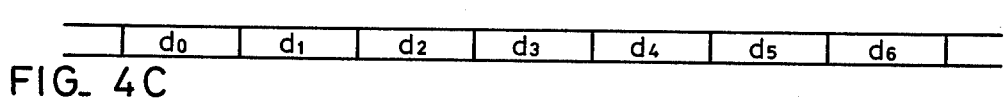
Figure 4D:
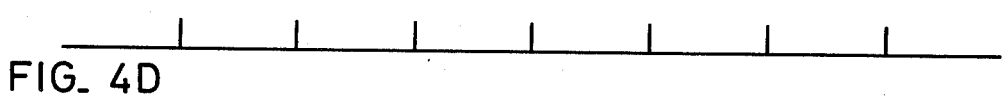
Figure 4E:
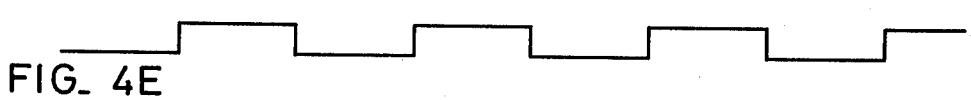
Figure 4F:
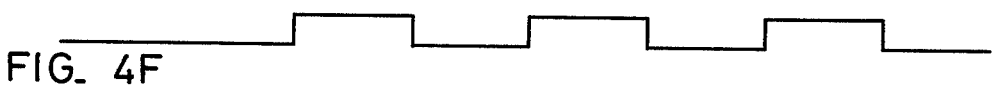

For example, output data of a device under test, provided at the input terminal 11, is determined by the comparators 12 and 13 to be either high or low in level. The decision is made, in terms of timing, by the clock signal from the terminal 16, such, for example, as shown in FIG. 4A, producing outputs shown in FIGS. 4B and 4C respectively. These outputs are respectively provided to the gates 21, 28 and 22, 29. An input clock signal to the shift register 39 (FIG. 4D) is spatially divided into two series of clock signals which are displaced one time slot apart in phase and occur with a period of two time slots, as depicted in FIGS. 4E and 4F respectively.

In the 2m time slot, a clock signal is applied only to the flip-flop 23, and no clock signal is applied to the flip-flop 38; namely, the flip-flops 23 and 38 each read therein data by the rise-up of the clock signal applied to its clock terminal C. Consequently, only the outputs from the gates 21 and 22 can be read in the flip-flop 23. On the other hand, in the 2m+1 time slot, only the outputs from the gates 28 and 29 can be read in the flip-flop 38.

Figure 4G:
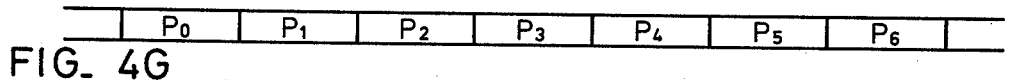
Figure 4H:
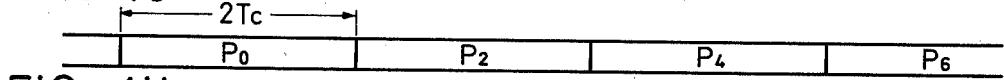
Figure 4I:
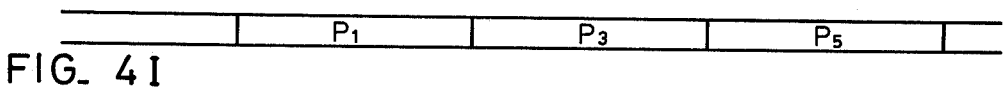
Figure 4J:
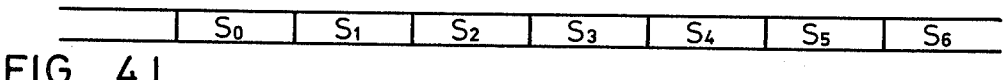

The reference logical data from the terminal 17, such, for example, as shown in FIG. 4G, is divided by the flip-flops 19 and 26 into data which are displaced one time slot apart in phase and have an effective length of two time slots, as depicted in FIGS. 4H and 4I respectively. In the 2m time slot, the output from the flip-flop 19 and those from the comparators 12 and 13 are compared by the gates 21 and 22 respectively, and the comparison results can be read in the flip-flop 23, as described in the foregoing. In the 2m+1 time slot, the output from the flip-flop 26 and those from the comparators 12 and 13 are compared by the gates 28 and 29, and only the results of this comparison can be read in the flip-flop 38. If the gates 36 and 37 are open, then the data are read in the flip-flops 23 and 38. As a result, the OR gate 41 provides the result of comparison between the level decided outputs $D_0$ and $d_0$ for the input logical data and the reference logical data $P_0$, and the result of comparison between the level decided outputs $D_1$ and $d_1$ for the input logical data and the reference logical data $P_1$, as indicated by $S_0$ and $S_1$ respectively in FIG. 4J.

If the phase of the clock signal from the terminal 16 is altered, then the output from the comparator output circuit 40 is also varied in the timing of outputting the compared outputs $S_0, S_1, \ldots$. But in the second output circuit 48, the outputs from the flip-flops 23 and 38 are sequentially read by the gates 49 and 43 and read in the flip-flop 46 at the fixed timing of the terminal 44; accordingly, the comparison result is always outputted at the terminal 47 at a constant timing.

As will be appreciated from the foregoing description, the reference data applied to the gates 21, 22, 28 and 29 for comparison use have an effective period of two time slots, so that letting a minimum period of the effective data of the data inputs to the flip-flops 23 and 38 be represented by $T_S$, the range for setting the clock signal from the terminal 16 is $2T_C - T_S$. Accordingly, the comparison can be achieved in an arbitrary phase of one time slot, and even if the input data becomes high-speed to cause $T_C - T_S$ to approach zero, correct compared outputs can be obtained.

In general, a similar comparing operation can be performed by dividing reference logical data into n data sequentially displaced one time slot apart in phase, converting them into data effective for a period of n time slots and dividing a clocking signal into n clock signals displaced one time slot apart in phase and occurring with a period of n time slots. In the foregoing, the shift registers 27, 39 and 45 are employed for dividing clock signals; but it is also possible to use an n-step ring counter for counting the clock signals and to take out outputs from its respective stages. In the case of n=2, it is possible to employ a toggle type flip-flop and to take out its Q and $\overline{Q}$ outputs.

As has been described in the foregoing, according to the logical comparison device of this invention, the range for setting a clock signal for determining the timing of comparison is $nT_C - T_S \cdot T_S$ is a value inherent to the circuit used and is difficult to greatly reduce, and in the case of the device being made high-speed in operation, $T_C$ is diminished, resulting in $T_C \approx T_S$ in some cases; but even in such cases, $nT_C - T_S$ can be made to have a desired value by selecting n large.

It will be apparent that many modifications and variations may be effected without departing from the scope of the novel concepts of this invention.

What is claimed is:

1. A logical comparison device operatively connected to receive a reference logical data train, a clock signal and input logical data, comprising:
    a data dividing circuit for generating spatially divided reference logical data by sequentially dividing the reference logical data train for each time slot into n (n being an integer greater than 1) data trains sequentially displaced one time slot apart in phase, each data of the n data trains having an n time slot length;
    a clock signal dividing circuit for generating spatially divided clock signals by dividing the clock signal, for determining the timing of comparison, into n clock signals displaced one time slot apart in phase and occurring with a period of n time slots;
    comparator means, operatively connected to said data dividing circuit, for comparing the input logical data to the spatially divided reference logical data to detect whether or not they are coincident with each other, wherein the timing of comparison is determined in accordance with the clock signal; and
    a comparison output circuit, operatively connected to said clock signal dividing circuit and said comparator means, for reading out the comparison results from said comparator means by the spatially divided clock signals.

2. A logical comparison device according to claim 1, wherein said logical comparison device is operatively connected to receive a control signal, said device further comprising control signal dividing means, operatively connected to said data dividing circuit, for dividing, in synchronization with said data dividing circuit, the control signal, for determining whether to achieve the comparison, into n control signals which are displaced one time slot apart in phase, each control signal having an n time slot width; and gate means connected between said comparator means and said comparison output circuit and operatively connected to said control signal dividing means, for providing the comparison results in dependence upon the divided control signals corresponding thereto.

3. A logical comparison device according to claim 1, wherein said logical comparison device is operatively connected to receive a second clock signal having a fixed timing and having the same period as the clock signal, said device further comprising a second output circuit, operatively connected to said comparison output circuit, which is supplied with each of the comparison results read out by the spatially divided clock signals and controlled by the second clock signal to provide as an output the supplied comparison result at the timing of the second clock signal.

4. A logical comparison device operatively connected to receive a reference logical data train, an input logical data train, and a first clock signal, comprising:
    data dividing means, operatively connected to receive the reference logical data train, for generating first and second spatially divided reference logical data signals by sequentially dividing the reference logical data train for each time slot into two data trains sequentially displaced one time slot apart in phase, each data portion of the two data trains having a two-slot length;
    clock signal dividing means, operatively connected to receive the first clock signal, for generating first and second spatially divided clock signals by dividing the first clock signal, for determining the timing of comparison, into two clock signals displaced one time slot apart in phase and occurring with a period of two time slots;

timing decision means, operatively connected to receive the input logical data train and the first clock signal, for generating first and second input signals at a timing controlled by the first clock signal;

comparator means, operatively connected to said data dividing means and said timing decision means, for comparing said first and second input signals to said first and second spatially divided reference logical data signals to detect whether or not they are coincident with each other and for generating first and second comparison results signals, wherein the timing of the comparison is determined in dependence upon the first clock signal; and comparison output means, operatively connected to said clock signal dividing means and said comparator means, for receiving the first and second comparison results signals from said comparator means in dependence upon said first and second spatially divided clock signals and for generating a first output signal.

5. A logical comparison device as set forth in claim 4, wherein said logical comparison device is operatively connected to receive a control signal, said device further comprising:

control signal dividing means, operatively connected to said data dividing means, for generating first and second divided control signals by dividing, in synchronization with said data dividing means, the control signal, for determining whether to achieve the comparison, into two control signals which are displaced one time slot apart in phase, each of said two control signals having a two time slot width; and gate means, connected between said comparator means and said comparison output means and operatively connected to said control signal dividing means, for providing the first and second comparison results signals in dependence upon said first and second divided control signals.

6. A logical comparison device as set forth in claim 4 or 5, wherein said logical comparison device is operatively connected to receive a second clock signal having a fixed timing and having the same period as said first clock signal, said device further comprising:

second output means, operatively connected to said comparison output means and operatively connected to receive the second clock signal, said second output means supplied with the first and second comparison results signals received by said comparison output means in dependence upon the second clock signal, said second output means for generating a second output signal.

7. A logical comparison device as set forth in claim 4, wherein said data dividing means is operatively connected to receive a third clock signal and wherein said data dividing means comprises:

a first shift register for receiving the third clock signal and for generating third and fourth spatially divided clock signals;

a first flip-flop, operatively connected to said comparator means and said first shift register, for receiving the reference logical data train and said third spatially divided clock signal and for generating said first spatially divided reference logical data signal; and a second flip-flop, operatively connected to said comparator means and to said first shift register, for receiving the reference logical data train and said fourth spatially divided clock signal and for generating said second spatially divided reference logical data signal.

8. A logical comparison device as set forth in claim 4 or 7, wherein said comparison output means comprises:

a third flip-flop, operatively connected to said comparator means and said clock signal dividing means, for providing said first comparison results signal in dependence upon said first spatially divided clock signal;

a fourth flip-flop, operatively connected to said comparator means and said clock signal dividing means, for providing said second comparison results signal in dependence upon said second spatially divided clock signal; and a first OR gate, operatively connected to said third and fourth flip-flops, for receiving as inputs said first and second comparison results signal and for generating said first output signal.

9. A logical comparison device as set forth in claim 8 wherein said clock signal dividing means comprises a second shift register.

* * * * *

UNITED STATES PATENT AND TRADEMARK OFFICE
CERTIFICATE OF CORRECTION

PATENT NO. : 4,270,116
DATED : May 26, 1981
INVENTOR(S) : YOSHICHIKA ICHIMIYA ET AL.

It is certified that error appears in the above—identified patent and that said Letters Patent is hereby corrected as shown below:

Front Page, [75] Inventors, "Kodaira" should be --Tokyo--.

Col. 3, line 9, "other and," should be --other, and--.

Col. 5, line 63, before "large" insert --to be--.

Signed and Sealed this

Twenty-second Day of September 1981

[SEAL]

Attest:

GERALD J. MOSSINGHOFF

Attesting Officer

Commissioner of Patents and Trademarks